Patented Nov. 18, 1941

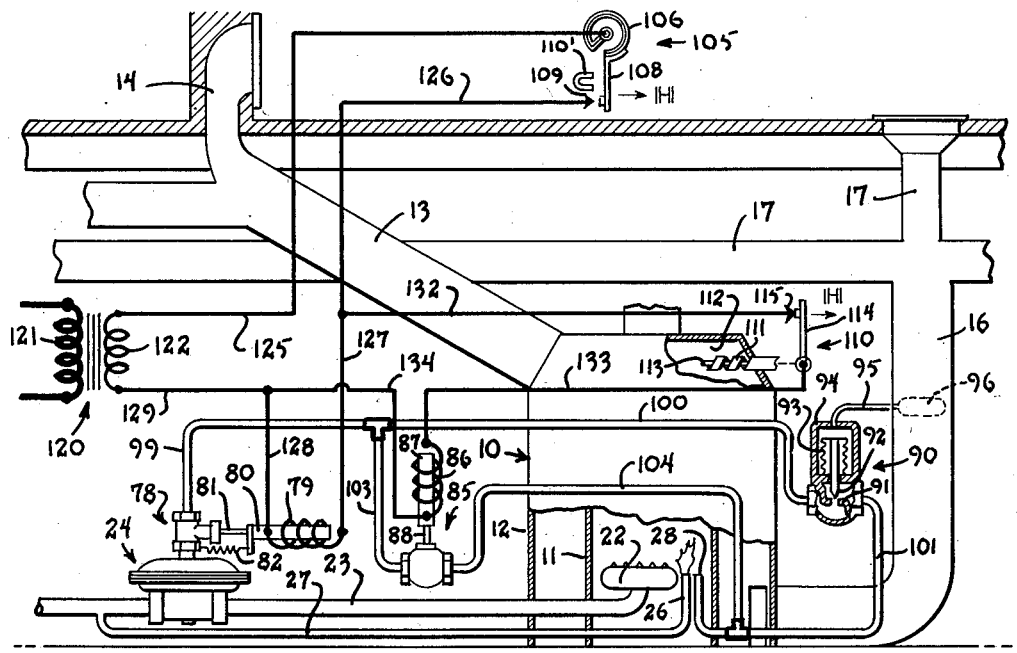

2,262,825

UNITED STATES PATENT OFFICE 2,262,825

TEMPERATURE CONTROL SYSTEM

Charles A. Welliver, Minneapolis, Minn., assignor to Minneapolis-Honeywell Regulator Company, Minneapolis, Minn., a corporation of Delaware Application January 3, 1938, Serial No. 183,015

10 Claims. (Cl. 236—9)

This invention relates to a temperature control system and more particularly to one in which there is modulation of the heat supply.

In the co-pending application of Frank A. Gauger, Serial No. 37,673 filed August 24, 1935, Patent No. 2,207,978, issued July 16, 1940, there is disclosed a heating system wherein the position of a diaphragm valve controlling the heat supply is modulated by a modulating control valve which is responsive to a controlling temperature. The diaphragm valve is also provided with a control valve responsive to room temperature and operated so that when the room temperature is above a desired value, the diaphragm valve is closed regardless of the position of the modulating control valve. Thus, in normal operation, the diaphragm valve is throttled back and forth controlling the operation of the temperature changing apparatus so as to deliver just the desired amount of heat. If, however, the temperature of the room rises above the desired value, the control of the diaphragm valve is taken away from the modulating control valve and the main valve is closed. In the specific form of the system shown in the application, the diaphragm valve controlled the flow of gas to a gas burner of a warm air heating system and the thermostatic modulating control valve was made responsive to the return air temperature. While this system proved to be highly satisfactory and had numerous advantages over the prior art, it possessed certain defects. In the first place the diaphragm valve, while constructed in a manner to provide an otherwise ideal mechanism for modulating purposes, had the defect that there was considerable differential between main valve positions for a given position of the control valve on the opening and closing cycles. In other words, when the diaphragm valve was being modulated towards open position, the valve assumed one set of positions corresponding to the different positions of the control valve and when the diaphragm valve was being modulated towards closed position, it assumed another set of positions. Obviously, this did not result in as close a temperature regulation as would otherwise be possible. Another defect in the system disclosed in the above mentioned Gauger application was that a condition occasionally arose in which upon a call for heat by the room thermostat the throttling valve was in such a position that the diaphragm valve opened to such a comparatively small extent that considerable time elapsed before the air in the bonnet was heated sufficiently to insure adequate circulation. In the case of gravity circulation, such circulation would not take place until the air was heated. In the case of forced circulation, means are usually provided for insuring that such circulation does not take place until the air is adequately heated.

An object of the present invention is to provide a diaphragm valve with means for modulating the position thereof in accordance with a controlling condition in which supplemental control means is provided for causing the valve to move to a wide open position.

A further object of the invention is to provide a diaphragm valve with means for modulating the position thereof in accordance with a controlling condition in which there is a considerable differential between positions assumed for a given value of the condition on the opening and closing cycles and in which at the start of each cycle, the valve is moved to a wide open position so that said valve always starts its modulating movement from the open position.

A further object of the present invention is to provide a fluid heating system for a space wherein a modulating valve is employed to control the heating apparatus and wherein means are provided for causing said valve to move to wide open position whenever there is a call for heat and the temperature of the fluid is below a predetermined minimum.

Other objects of the present invention will be apparent from a consideration of the accompanying specification, claims, and drawing of which:

Figure 1 is a schematic view of the improved temperature control system and of which, Figure 2 is a sectional view of the diaphragm valve employed therein.

Referring to the drawing, a conventional warm air furnace is generally indicated by the reference numeral 10. This furnace consists in the usual manner of an inner casing 11 constituting the furnace proper, and an outer casing 12 providing a passage for the circulation of air around the furnace. Leading from the casing 12 is a delivery duct 13, which is provided with a plurality of branch ducts 14 leading to different rooms of the building being heated. Leading into the casing 12 is a return air duct 16 which is provided with branch ducts 17 for conveying the return air from the various rooms. The air, in the conventional manner, enters the casing 12 in the lower portion thereof and as it is heated by contact with the furnace 11 passes upwardly through the delivery duct 13 to the various rooms. The air as it is subsequently cooled enters the branch return air ducts 17 and thence into the main return air duct 16. While the system is shown as being of the type employing gravity circulation, it is to be understood that a motor driven fan may be employed in connection therewith for providing forced circulation in the conventional manner.

Located within the furnace 11 is a gas burner 22, this gas burner is supplied with gas through a pipe 23 and the flow of gas thereto is controlled by a valve generally indicated by the reference numeral 24. This valve is shown in detail in Figure 2 and will be described in subsequent paragraphs.

Located adjacent to the main burner 22 is the pilot burner 26 which is supplied with gas through a pipe line 27 connected with the main gas line 23. Also located within the burner chamber is an auxiliary pilot burner 28. The sole function of this pilot burner, as will be more apparent from the subsequent description, is to burn the bleed gas.

The valve 24 will now be described in order to better understand the function of the various other elements of this system. Referring to Figure 2 the valve is shown as comprising a valve body 31 having the usual inlet and outlet passages 32 and 33, respectively. The valve body 31 is provided with a transverse partition wall 34 which is provided with an opening therethrough at its upper end to provide a valve seat 35. In its lowermost portion the opening is of such form as to provide a conical surface 36. Seated upon the valve seat 35 is a main valve disc 38 which is provided on its under surface with an annular member 39 of suitable valve facing material. The valve disc 38 has extending therethrough a plug member 40 and screw-threadedly secured in this plug member is a stem member 41. The stem member 41 is provided with a flange 42 at its lower end. The stem member 41 is further provided with an elongated recess 43 into which recess a guide member 44 extends. This guide member is supported in the valve body 31 by a screw threaded plug 45 to which it is rigidly secured. The screw headed plug 45 is secured in an aperture 46 which is closed by a plug 47. Access to the plug 45, when desired, can be readily had by removal of the plug 47.

Supported on the stem member 41 are a plurality of discs 49. These discs are all provided with apertures 50. The discs are also provided with flanges 51 along their inner periphery. The various discs 49 are all progressively decreased in size, and are adapted to seat upon the conical surface 36. Not only are the discs progressively decreased in size but the perforations in the disc are also decreased in size, the larger perforations being in the top disc. As the stem 41 is moved upwardly, the shoulder 42 first engages the lowermost disc 49. When this happens, this disc is lifted off of its seat and the gas needs to no longer pass through the perforations therein. Since the smallest perforations are in this disc, the movement of the disc from its seat increases the gas flow. As each successive disc is lifted from its seat it is further increased. It is to be understood that no flow of gas can take place without the main valve 38 being off of the seat 35.

A passage 55 is provided through the partition 34 in such a location that it constitutes a by-pass around the discs 49. The amount of flow through this by-pass is controlled by a needle valve 56 which is screw-threadedly mounted in a casing member 31 and is provided with a slot 57 for adjustment thereof. A locknut 58 is provided for the purpose of locking the needle valve in its adjusted position.

The valve casing member 31 is flared at its upper portion to provide the lower half of a diaphragm casing. At its outer edge the casing 31 is provided with a flange 60. Cooperating with the upper portion of valve casing 31 is a second casing member 61 which is similarly provided with an annular flange 62. Clamped between the flanges 60 and 62 of the casing members 31 and 61 by any suitable means (not shown) is a diaphragm 63. This diaphragm is provided with an upper backing plate 64 of metal or other similarly rigid material. A lower backing plate 65 is also provided and the two backing plates 64 and 65 are held in assembled relationship with the diaphragm by means of a flanged sleeve 66 and a nut 67 threadedly engaged with the upper portion thereof. The two backing plates 64 and 65 and the diaphragm 63 are clamped between nut 67 and the outer flange of sleeve 66. Extending into the upper end of plug 40 in screw threaded engagement therewith is a screw member 69 which is provided with an enlarged head 70 to constitute a flange at the upper edge of plug 40. The head 70 of the screw 69 is adapted to engage an interior flanged portion 71 of the sleeve 66, the flanged portion 71 not extending all the way around sleeve 66. A plug 73 is screwed into the upper end of sleeve 66, the plug being provided with an aperture 74 for a purpose to be described later.

The sleeve 66 together with the plug 40 and the screw 69 constitutes a lost motion connection between the diaphragm 63 and the main valve disc 38, as will be obvious from a consideration of the drawing in the light of the preceding description. The diaphragm 63 constitutes the movable wall of a pressure motor and is the actuating means for both the main valve 38 and the throttling valve means constituted by the discs 49. Means are provided for changing the relative pressures on the two sides of the diaphragm. As the pressure underneath the diaphragm becomes greater than that above the diaphragm the diaphragm 63 is moved upwardly. The first movement thereof has no effect upon any of the valves 38 by reason of the lost motion between the flanged portion 71 of sleeve 66 and the head 70 of screw 69. As soon as flanged portion 71 does engage with head 70 however, valve 38 is moved off of its seat. As soon as valve 38 is moved even slightly off of its seat, gas pressure is admitted underneath valve disc 38 and by reason of the relatively large size of the valve disc 38 with respect to diaphragm 63, this increase in area exposed to the inlet pressure causes further movement of the diaphragm to take place abruptly causing a snap movement of valve disc 38 away from its seat. After an initial movement of valve disc 38 has taken place, the lost motion between flange 42 of stem 41 and the lowermost disc 49 is taken up where upon further movement of diaphragm 63, the lowermost disc 49 is moved off of its seat. As the diaphragm 63 is moved up farther, the discs are successively lifted off of their seats. As soon as valve disc 38 is moved off of its seat, with a snap action as described above, gas is passed through the valve structure by reason of the by-pass 55. This by-pass is adjusted so as to be of sufficient size that the flow of gas therethrough taken in connection with the flow of gas through the apertures of discs 49 is sufficient to establish a minimum flow, which is sufficiently large to permit proper ignition of the burner.

It will be noted there is a considerable amount of clearance between the inner flanged portion 71 of sleeve 66 and the upper portion of plug member 40. Thus at all times gas is able to pass from the lower inlet chamber through this space between flanged portion 71 and the upper portion of plug 40 and through the aperture 74 of plug 73 to the upper side of the diaphragm. An aperture 76 is provided in the upper wall of casing 61 to permit, under certain circumstances, the escape of this gas at a rate faster than it is admitted to the upper chamber through the passages just described.

Referring again to Figure 1 it will be noted that a control valve member 78 is provided adjacent the passage leading from the upper portion of casing member 61. This valve 78 is of the electromagnetically actuated type and is shown for purposes of illustration as being operated by a solenoid arrangement consisting of a solenoid winding 79 which cooperates with a solenoid core 80 secured to the valve stem 81. A spring 82 biases the valve towards closed position. The winding 79 through its cooperative action with core 80 is operative when energized to move the valve towards open position against the action of biasing spring 82.

A second control valve is designated by the reference numeral 85. This control valve is likewise shown as being of the solenoid type, in which the actuating mechanism consists of a solenoid winding 86 which cooperates with a solenoid core 87 secured to the valve stem 88. In this particular valve, the valve is biased to closed position by gravity or other means (not shown) and is moved to open position upon energization of winding 86.

A third control valve is generally designated by the reference numeral 90. This valve is shown in section. Valve assembly 90 consists of a valve seat 91 with which cooperates a valve member 92. Valve member 92 is secured to a bellows 93, which bellows is located within a fluid tight housing 94. Communicating with the interior of the housing 94 is a section of capillary tubing 95 which communicates with a bulb 96 containing a volatile fluid of any suitable type. The bulb 96 is located in the return air duct 16 so as to be subject to the temperature of the return air. As the temperature of the return air rises, the increase in pressure of the volatile fluid forces bellows member 93 and consequently valve member 92 downwardly towards valve closed position. It is to be noted that the valve device 90 unlike the valves 78 and 85 may assume any one of a number of controlling positions. Valve 90 thus constitutes the throttling control valve of the system. It is to be understood that, in lieu of a volatile fluid actuated valve, a valve actuated by any other temperature responsive means which is capable of providing a modulating action, may be employed instead.

Connecting valves 78 and 90 are two pipes 99 and 100. Communicating with the outlet side of valve 90 is a third pipe 101 which leads to the auxiliary pilot burner 28. It will thus be noted that pipes 99, 100, and 101 constitute a bleed line for the upper chamber of the diaphragm valve 24, which bleed line is controlled by valves 78 and 90 in series. Connected with pipe 99 is a pipe 103 which connects with the inlet side of valve 85. Extending between the outlet side of valve 85 and the auxiliary pilot burner 28 is a pipe 104. It will be noted that pipes 103 and 104 constitute a bleed connection in parallel with valve 90, which parallel bleed connection is controlled by valve 85.

Located within the room or other space being heated is a thermostat 105. This thermostat may be of any conventional type, being shown as comprising a bimetallic element 106 to which is secured a contact arm 108. The contact arm 108 is adapted to be engaged with a fixed contact 109 upon a temperature fall. Associated with the contact 108 is a magnet 110' which serves to impart a snap action to the movement of contact arm 108. This snap action both serves to reduce the sparking between contact arm 108 and contact 109 and also to make necessary a temperature differential for the opening and closing of the thermostat. This temperature differential prevents frequent energization and deenergization of the controlled apparatus as a result of the thermostat chattering slightly as it approaches or leaves its contacts.

A thermostatic device responsive to the temperatures of the air in the bonnet portion of the furnace 10 is generally indicated by the reference numeral 110. This thermostatic device 110 comprises a helical bimetallic element 111 extending into the bonnet portion 112 of the furnace 10, which helical bimetallic element 111 is secured at its inner end to a rod 113 which in turn is secured to a switch blade 114. The switch blade 114 is adapted to be moved into and out of engagement with a contact 115. As indicated by the legend on the drawing, the switch blade 114 is moved out of engagement with the contact 115 upon a temperature rise. The device 110 is so adjusted normally that switch blade 114 is out of engagement with contact 115 whenever the bonnet temperature attains a value wherein the circulation of air to the rooms would not produce a sensation of chilling drafts.

A step-down transformer 120 is provided for the purpose of supplying power for the operation of the control portion of a heating system. This transformer comprises a line voltage primary 121 connected to any suitable source of power (not shown) and a low voltage secondary 122.

*Operation*

The various elements of the system are shown in the position they assume when the temperature in the space being heated is at or above a desired value, and when the return air temperature is such that the throttling control valve 90 is practically wide open. As it is shown in the drawing, moreover, the temperature in the bonnet 112 is such that switch 114 is engaged with contact 115. Let it be assumed that the temperature now falls in the space until engagement of contact arm 108 with contact 109 is effected. This engagement of contact arm 108 with contact 109 will result in the establishment of the following circuit to the solenoid coil 79: from the upper terminal of secondary 122 through conductor 125, bimetallic element 106, contact arm 108, contact 109, conductor 126, conductor 127, solenoid coil 79 and conductors 128 and 129 to the other terminal of secondary 122. Establishment of this energizing circuit to solenoid coil 79 results in the opening of valve 78. So long as valve 78 is closed, gas is not permitted to escape from the upper side of the diaphragm 63. The result is that the pressure on the upper side of the diaphragm becomes equal to that on the lower side of the diaphragm. Due to the fact that the area exposed to the pressure on the lower side is decreased by the area of the valve, the total pressure on the upper side is actually greater than that on the lower side. The result is that the valve disc 38 is firmly held on its seat 35 and the various discs 49 are seated upon the conical surface 36. As soon as valve 78 is opened, however, the gas is permitted to escape from the chamber on the upper side of the diaphragm. The result is that gas may flow through the valve 78, pipes 99 and 100, valve 90, pipe 101 to the auxiliary pilot burner 28 where it escapes to the atmosphere being burned by the pilot flame of pilot burner 26. As soon as the pressure above diaphragm 65 is relieved to the point that the total pressure on the under side of the diaphragm is greater than the total pressure above the diaphragm the valve 38 will be moved from its seat. As soon as this takes place, the increased area subjected to gas pressure, by reason of valve 38 now being exposed to gas pressure, results in total pressure on the underside of the diaphragm being suddenly increased with the result that the valve is moved away from its seat with a snap action. As previously explained, as soon as the valve is so moved away from its seat a minimum flow is established to passage 55 to the burner 22. This minimum flow together with the flow which is able to take place through the perforations 50 in discs 49 is sufficient to insure proper ignition of burner 22 without any "pop back." The gas admitted to the burner is ignited by the flame of the pilot burner 26. After the valve disc 38 has snapped away from its seat it will continue to travel upwardly lifting successive discs 49 off of their seat on the conical surface 36. As each successive disc is lifted the pressure differential necessary for further movement of the valve is increased. The discs thus act both as a means of throttling the flow and also as a means for adding increasing bias to the diaphragm.

Were it not for valve 85, the movement of diaphragm 63 upwardly would continue until a position is reached at which the pressure on the upper surface, by reason of the restriction offered by throttling valve 90 in the bleed line, is just sufficiently lower than the pressure on the under side of the diaphragm to support the diaphragm assembly and certain of the discs in that position, which position would normally be some intermediate position between full open and full closed positions. Thereafter if the temperature of the return air decreased causing throttling valve 90 to be opened wider and permitting a freer escape of gas from the upper side of the diaphragm 63, the pressure above the diaphragm would be further decreased and the valves would assume a new position closer to full open position. On the other hand when the return air temperature increased, the pressure above the diaphragm would be increased and the valves would be throttled towards closed position. As indicated in an earlier portion of the specification, this operation has two distinct diadvantages. In the first place by reason of the fact that the lifting of each disc from its seat has a marked change not only upon the bias but also the pressure effect on the diaphragm, there is considerable difference in positions assumed by the valves for a given position of the throttling valve 90 on the closing and opening cycles of the main valve. In other words, when the valve is being throttled towards open position, the valve assumes one set of positions and when it is being throttled towards closed position it assumes another set of positions. This differential is partly due also to the internal friction of the diaphragm itself as well as to a certain amount of friction in the various moving parts. In addition, the moving of the valves initially to only a partially open position has the disadvantage that some little time may elapse before the bonnet is warmed up sufficiently due to the fact that the burner is being operated at only a small part of its capacity. Inasmuch as the room thermostat has already called for heat it is desirable that there be a circulation of air just as soon as possible. With the system shown in the drawing, there will be no circulation until the bonnet is warm due to the fact that the circulation depends upon the difference in temperature between the air in the bonnet and the return air. In the case where a motor driven fan is employed it is the customary practice to control this fan in part at least by a switch which prevents operation of the fan until the bonnet temperature has risen to a point where the circulation of the air therefrom would not cause a chilling sensation in the room.

The disadvantages outlined in the above paragraph are overcome in the present invention by the provision of the valve 85. It will be noted that when thermostat 105 is closed, the following energizing circuit is established to solenoid winding 86, in addition to the previously traced energizing circuit to solenoid winding 79: from the upper terminal secondary 122 through conductor 125, bimetal element 106, contact blade 108, contact 109, conductors 126 and 132, contact 115, switch blade 114, conductor 133, solenoid winding 86, and conductors 134 and 129 to the other terminal of secondary 122. The establishment of this circuit results in the valve 85 being immediately moved to wide open position. As previously noted the valve 85 controls a by-pass or a shunt line to the portion of the bleed line controlled by valve 90. In other words the gas may now pass from valve 78 through pipe 99, pipe 103, valve 85, and pipe 104 to the auxiliary burner 28. Moreover, it will be noted that there are no throttling control valves in this bleed line at all so that the gas may pass out from the upper chamber freely. The result is that the diaphragm 63 continues to move until the valves actuated thereby are in their full open position. Gas will now be admitted to burner 22 in such quantities as to operate the burner at its maximum capacity.

As soon as the temperature has risen sufficiently in bonnet 112, the switch blade 114 will be moved out of engagement with contact 115. It will be recalled that the switch consisting of switch blade 114 and contact 115 is in series with solenoid winding 86. The result of opening this switch, therefore, is that the valve 85 is moved to closed position. The effect of the closure of valve 85 is that gas no longer is able to pass through the shunt line but must all pass through the throttling control valve 90. The pressure above diaphragm 63 will accordingly build up to the point corresponding to the position of throttling control valve 90. It will be noted however that the valves actuated by diaphragm 63 were moved directly to open position, and that the action of the throttling valve 90 is to cause the main valves controlled by diaphragm valve 63 to be moved towards closed position. Under almost any normal condition, any movement of the main valves by reason of the change of position of throttling valve 90 will be in the direction of a closed position since by reason of the continued operation of the burner the tendency of the temperature of the return air will be to rise, if it changes at all. Thus the main valves are, under normal circumstances, always being throttled towards closed position so that the differential between the positions assumed during the opening and closing cycle plays no part, beyond the desirable one of stabilizing the action of the valve and preventing a fluttering of the valve due to very slight variations in the return air temperature. Moreover, even if the main valves are subsequently modulated towards open position, the differential is much less than if the modulation towards open position had started from closed position.

The initial establishment of the maximum flow of gas to burner 22 also has the advantage of very quickly warming up the bonnet 112 so as to cause a very prompt circulation of air to the rooms.

Whenever the temperature in the space being heated rises above the predetermined desired value, the thermostat 105 is opened whereupon the previously traced energizing circuit to solenoid coil 79 is interrupted and the biasing spring 82 is now effective to close valve 78 thus cutting off the escape of gas from the upper side of the diaphragm 63. This causes the pressure to build up in the upper chamber as fast as the gas can pass through the bleed passage through the diaphragm. As the pressure builds up sufficiently the diaphragm 63 will move downwardly causing successive seating of the throttling valve discs 49. When the diaphragm 63 finally reaches a position wherein valve disc 38 approaches its seat 35, the pressure underneath the valve disc 38 will be so reduced that the total pressure underneath the diaphragm will be suddenly decreased. This will cause the differential to become greater causing the valve to approach still further to its seat. This in turn further reduces the pressure underneath the valve disc with the result that the valve is moved into engagement with its seat with a snap action.

It will be noted from the preceding description that I have provided means wherein the diaphragm valve is moved to wide open position immediately upon a call for heat and is maintained there until the temperature of the air or other heated fluid becomes sufficiently high. This initial wide open movement of the diaphragm valve eliminates the effect of any differential between valve positions on the opening and closing cycles. It will further be seen that upon the room thermostat being satisfied the diaphragm valve is moved to closed position regardless of the value of the throttling valve. At all other times the throttling control valve is able to modulate the position of the diaphragm valve to maintain an even flow of gas to the burner in accordance with the heat demand of the space.

While I have shown a specific embodiment of my invention for purposes of illustration it is to be understood that the invention is to be limited only by the scope of the appended claims.

I claim as my invention:

1. In a temperature control system, temperature changing apparatus, a main valve controlling the flow of a temperature changing medium to said apparatus, a pressure chamber including a movable wall, connections between said movable wall and said main valve whereby the position of said main valve is varied in accordance with the position of said wall, control means including a throttling control valve and a condition responsive device controlling the position of said control valve, said means being operative gradually to vary the relative pressure on opposite sides of said movable wall variably to position said wall and consequently said main valve, supplemental control means including a second control valve and a device responsive to a condition directly affected by operation of said temperature changing apparatus, said supplemental control means being operative, upon said second condition assuming a value attained only after said temperature changing device has been inoperative for an appreciable period, to cause the relative pressure on opposite sides of said movable wall to be changed relatively quickly in such a direction as to cause a relatively quick movement of the wall and main valve from closed to open position regardless of the position of said throttling control valve, and means for rendering said temperature changing apparatus operative and inoperative.

2. In combination, a pressure chamber including a movable wall, a main valve secured thereto, means including a throttling control valve and a condition responsive device controlling the position of said main valve, said means being operative gradually to vary the pressure on opposite sides of said movable wall variably to position said wall and consequently said main valve, a second control means including a second control valve and a device responsive to a second condition controlling the position of said control valve, said second control means being operative upon said second condition assuming a value within a predetermined range to cause the pressure on opposite sides of said movable wall to be changed relatively quickly in such a direction as to cause a relatively quick movement of the wall and main valve from closed to open position regardless of the position of said throttling control valve, and a third control means including a device responsive to a third condition and operative when said third condition assumes a value within a predetermined range to cause the relative pressure on opposite sides of said wall to be changed relatively quickly in such a direction as to cause a relatively quick movement of said main valve to closed position regardless of the position of said throttling control valve or of the value of said second condition.

3. In combination, a pressure chamber including a movable wall, a main valve secured thereto, means including a throttling control valve and a condition responsive device controlling the position of said main valve, said means being operative gradually to vary the pressure on opposite sides of said movable wall variably to position said wall and consequently said main valve, a second control means including a device responsive to a second condition, said second control means being operative upon said second condition assuming a value within a predetermined range to cause the pressure on opposite sides of said movable wall to be changed relatively quickly in such a direction as to cause a quick movement of the wall and main valve from closed to open position regardless of the position of said throttling control valve, and a third control means including a device responsive to a third condition and operative when said third condition assumes a value within a predetermined range to cause the relative pressure on opposite sides of said wall to be changed relatively quickly in such a direction as to cause a relatively quick movement of said main valve to closed position regardless of the position of said throttling control valve or of the value of said second condition.

4. In a temperature control system, apparatus for changing the temperature of a fluid, a control device rendering said apparatus operative and inoperative, means for circulating said fluid in heat exchanging relation with a space whose temperature is to be controlled, a valve controlling the flow of a temperature changing medium to said temperature changing apparatus, actuating means for said valve, means including a device responsive to the temperature of said fluid at a point which is indicative of the temperature of said space and operative to control said actuating means so that said valve is modulated in accordance with said temperature, and means including a device responsive to the temperature of said fluid whose temperature has just been changed by said temperature changing apparatus, said last named means being operative upon said temperature of said fluid being within a predetermined range to cause said actuating means to move said valve to wide open position so as to operate said temperature changing apparatus at its maximum capacity until said temperature is no longer within said range, said last two means being effective only if said control device has rendered said apparatus operative.

5. In a fluid heating system, apparatus including a fluid fuel burner for heating said fluid, a control device rendering said fuel burner operative and inoperative, means for circulating the heated fluid in heat exchanging relation with a space whose temperature is to be controlled, a valve controlling the flow of fuel to said burner, actuating means for said valve, means including a device responsive to the temperature of the fluid returning to said temperature changing apparatus from said space and operative to control said actuating means so that said valve is modulated in accordance with the value of said temperature, and means including a device responsive to the temperature of said fluid which has just been heated by said heating apparatus, said last named means being operative upon said temperature of said fluid being below a predetermined value to cause said actuating means to move said valve to wide open position so as to operate said temperature changing apparatus at its maximum capacity until said temperature has attained said predetermined value, said last two means being effective only if said control device has rendered said fuel burner operative.

6. In a warm air heating system, apparatus including a fluid fuel burner for heating said air, a control device rendering said fuel burner operative and inoperative, means for circulating the heated air in heat exchanging relation with a space whose temperature is to be controlled, a valve controlling the flow of fuel to said burner, actuating means for said valve, means including a device responsive to the temperature of said air at a point at which it will be indicative of the temperature of said space and operative to control said actuating means so that said valve is modulated in accordance with the value of said temperature, and means including a device responsive to the temperature of the air which has just been heated by said heating apparatus, said last named means being operative upon said temperature of the air being below a predetermined value to cause said actuating means to move said valve to wide open position so as to operate said temperature changing apparatus at its maximum capacity until said temperature has attained said predetermined value, said last two means being effective only if said control device has rendered said fuel burner operative.

7. In combination, a pressure chamber including a movable wall, a main valve secured thereto, means for slowly admitting pressure to said chamber in a manner to close said valve, a bleed line connected to said chamber for permitting the escape of said pressure, a control valve connected in said bleed line, means for variably positioning said control valve in accordance with the value of a first condition to cause said main valve to be variably positioned, a second control valve connected in said bleed line in series with said first control valve, means including a device responsive to a second condition for causing said second control valve to be either fully closed to cause the closure of said main valve or fully open depending upon the value of said second condition, and means controlled in accordance with the value of said second condition and a third condition operative when said second condition assumes a value such that said second control valve is opened and when said third condition assumes a value within a predetermined range to establish a by-pass around said first control valve to cause said main valve to move to wide open position.

8. In combination, a pressure chamber including a movable wall, a main valve secured thereto, means for slowly supplying pressure fluid to said chamber, a bleed line for bleeding pressure from said chamber, a first valve in said bleed line, a second valve in said bleed line, said second valve being a throttling valve for modulating said main valve while said first valve is open, a by-pass in said bleed line around said second valve, a third valve in said by-pass for bleeding pressure from said pressure chamber independently of said second valve, said action being dependent upon said first valve being open, a control device for opening and closing said first valve, means for throttling said second valve in response to the variations of a variable condition, and means responsive to a condition affected by the operation of said main valve, said last named means acting in conjunction with said control device and in response to said last named condition for simultaneously opening said first and third valves to open said main valve wide, the action of said last named means being dependent upon said main valve having been closed, said last named means later closing said third valve in response to said last named condition whereby said main valve is thereafter modulated in accordance with the position of said second valve as long as said first valve is open.

9. In combination, a valve, actuating means therefor, means including a device responsive to a first condition for causing said actuating means to variably position said valve in accordance with the value of said first condition, said actuating means and said valve being so constructed that for a given value of said first condition, said valve assumes substantially different positions when moving in opening direction than when moving in closing direction, means including a device responsive to a second condition for causing said valve to be closed when said second condition assumes a value within a predetermined range, a third condition responsive device, and control means rendered operative by said third condition responsive device after closure of said valve, for causing said actuating means initially to move said valve to wide open position under the control of said second condition responsive device when said second condition assumes a value outside of said range, said wide open movement taking place regardless of the value of said first condition, said control means being rendered inoperative again by said third condition responsive device after said valve has been opened wide.

10. In combination, a main valve, a pressure motor connected to said valve for actuating the same, means including a device responsive to a first condition, and a modulated control valve for varying the pressure in said pressure motor to variably position said main valve in accordance with the value of said condition, said pressure motor and said valve being so constructed that for a given value of said first condition said valve assumes substantially different positions when moving in opening direction than when moving in closing direction, means including a device responsive to a second condition, and a second control valve operative to so vary the pressure in said pressure motor upon said second condition assuming a value within a predetermined range that said main valve is closed by said pressure motor, a third condition responsive device, and control means rendered operative by said third condition responsive device after closure of said main valve, to cause said pressure in said pressure motor to be changed relatively quickly by said second condition responsive device when said second condition again assumes a value outside said range to move said valve directly to open position regardless of the value of said first condition, said control means being rendered inoperative again by said third condition responsive device after said valve has moved directly to open position.

CHARLES A. WELLIVER.